United States Patent
Cao et al.

(10) Patent No.: US 12,105,717 B2
(45) Date of Patent: Oct. 1, 2024

(54) METHOD AND DEVICE FOR PROCESSING INFORMATION BY BATCH-STREAM FUSION, AND STORAGE MEDIUM

(71) Applicant: SHANGHAI KYLIGENCE INFORMATION TECHNOLOGY CO., LTD., Shanghai (CN)

(72) Inventors: Lu Cao, Shanghai (CN); Hongbin Ma, Shanghai (CN); Yifan Zhang, Shanghai (CN); Zhixiong Chen, Shanghai (CN); Yang Li, Shanghai (CN); Qing Han, Shanghai (CN)

(73) Assignee: SHANGHAI KYLIGENCE INFORMATION TECHNOLOGY CO., LTD., Shanghai (CN)

( * ) Notice: Subject to any disclaimer, the term of this patent is extended or adjusted under 35 U.S.C. 154(b) by 24 days.

(21) Appl. No.: 18/092,326

(22) Filed: Jan. 1, 2023

(65) Prior Publication Data

US 2023/0153308 A1    May 18, 2023

Related U.S. Application Data

(63) Continuation of application No. PCT/CN2021/123288, filed on Oct. 12, 2021.

(30) Foreign Application Priority Data

Sep. 8, 2021  (CN) .......................... 202111049808.5

(51) Int. Cl.
*G06F 16/00*   (2019.01)
*G06F 16/22*   (2019.01)
(Continued)

(52) U.S. Cl.
CPC ........ *G06F 16/24568* (2019.01); *G06F 16/22* (2019.01); *G06F 16/2386* (2019.01); *G06F 16/2456* (2019.01)

(58) Field of Classification Search
None
See application file for complete search history.

(56) References Cited

U.S. PATENT DOCUMENTS

2013/0073586 A1*  3/2013  Aubry ................. G06F 16/2455
                                                           707/769
2018/0157749 A1   6/2018  Statchuk

FOREIGN PATENT DOCUMENTS

CN       109063017 A    12/2018
CN       111143411 A     5/2020
(Continued)

OTHER PUBLICATIONS

International Search Report, issued in PCT/CN2021/123288, dated Jun. 7, 2022.
(Continued)

*Primary Examiner* — Anhtai V Tran
(74) *Attorney, Agent, or Firm* — Westbridge IP LLC

(57) ABSTRACT

The present invention discloses a method and a device for processing information by batch-stream fusion, and a storage medium. The method comprises the following steps: Obtaining an index based on an input query statement; extracting a pre-computed index data segment based on the index as a query result; and extracting a re-computed index data segment to update the query result. The present invention solves the technical problem that real-time data and offline data are difficult to fuse and analyze.

7 Claims, 2 Drawing Sheets

(51) Int. Cl.
 *G06F 16/23* (2019.01)
 *G06F 16/2455* (2019.01)

(56) References Cited

FOREIGN PATENT DOCUMENTS

| CN | 112527839 A | 3/2021 |
| CN | 112835966 A | 5/2021 |

OTHER PUBLICATIONS

Written Opinion, issued in PCT/CN2021/123288, dated Jun. 7, 2022.

* cited by examiner

METHOD AND DEVICE FOR PROCESSING INFORMATION BY BATCH-STREAM FUSION, AND STORAGE MEDIUM

The present application is a continuation of International Application No. PCT/CN2021/123288, filed Oct. 12, 2021, which claims the priority of Chinese Patent Application No. 202111049808.5, field on Sep. 8, 2021. The contents of International Application No. PCT/CN2021/123288 and Chinese Patent Application No. 202111049808.5 are hereby incorporated by reference.

TECHNICAL FIELD

The present invention belongs to the technical field of data processing, and particularly relates to a method and a device for processing information by batch-stream fusion, and a storage medium.

BACKGROUND ART

With the advent of industry 4.0 and 5G era, people have higher and higher requirements for the timeliness of data processing. Studies show that the value of data is reduced as time goes on. In contrast, the more real-time the data is, the higher the value of the data is. Under such background, a number of excellent open source stream computing frameworks such as Storm, Spark, Kafka and Flink have emerged in the industry. However, although many stream computing frameworks declare to have the processing capability of batch-stream integration, in fact, batch processing and stream computing are different in use scene and emphasis, namely stream computing focuses on the timeliness of data, batch processing focuses on the integrity, accuracy and computing cost of the data, and a batch processing system such as Hive cannot be completely replaced. Therefore, it is hard for people to fuse and analyze the real-time data and the offline data. The problems that the data calibers are inconsistent, the semantics are not unified, cross-system query cannot be achieved, the query performance cannot meet the requirements and the like are often an insurmountable divide for big data architects and engineers.

In conclusion, the prior art has the following technical problem:

it is hard to fuse and analyze the real-time data and the offline data.

SUMMARY OF THE PRESENT INVENTION

In order to solve the above technical problem, the present invention provides a method for processing information by batch-stream fusion, the method comprises the following steps:

obtaining an index based on an input query statement;
extracting a pre-computed index data segment based on the index as a query result; and
extracting a re-computed index data segment to update the query result.

Preferably, the step of extracting the pre-computed index data segment based on the index as the query result specifically includes:

acquiring statistical information of the index;
retrieving a pre-created index with the statistical information in an internal memory;
positioning the pre-computed index data segment in the storage medium based on the pre-created index;
taking the positioned pre-computed index data segment as the query result.

Preferably, the step of extracting the pre-computed index data segment specifically includes:

defining a pre-created index based on a predefined unified model;
performing pre-computation based on the pre-created index to obtain the index data segment; and
storing the statistical information of the pre-created index in an internal memory, and storing the pre-computed index data segment in the storage medium.

Preferably, the step of defining the pre-created index based on the pre-defined unified model specifically includes:

obtaining a pre-created stream data source mapping table and a batch data source mapping table, the stream data source mapping table being a fact table, and the batch data source mapping table being a shadow table bound with the stream data source mapping table;
obtaining a dimension and a measurement of connection between the pre-created fact table and the shadow table;
determining a connection relationship of the fact table and the shadow table to the dimension table based on the obtained dimension and measurement; and
defining the pre-created index based on the connection relationship.

Preferably, the step of computing based on the pre-created index to obtain the index data segment specifically includes:

obtaining the pre-created index, the pre-created index being divided into a batch index, a stream index and a fusion index;
pre-computing in a data source through a computation engine based on the pre-created index, the computation engine comprising a batch processing computation engine and a stream processing computation engine, and the data source including a batch data source and a stream data source; and
obtaining the pre-computed index data segment based on pre-computation, the pre-computed index data segment being divided into a batch index data segment and a stream index data segment.

Preferably, the step of storing the statistic information of the pre-created index into the internal memory specifically includes:

extracting statistical information of the pre-created index, the statistical information including the number of rows, the size and the cardinal number.

Preferably, the step of extracting the re-computed index data segment to update the query result specifically includes:

performing re-computation in the data source based on the index, the index being divided into the batch index, the stream index and the fusion index, and the data source including the batch data source and the stream data source;
performing re-computation through the computation engine to obtain a re-computed index data segment, the computation engine comprising the batch processing computation engine and the stream processing computation engine, and the re-computed index data segment being divided into the batch index data segment and the stream index data segment.
storing the re-computed index data segment in the storage medium; and
extracting the re-computed index data segment in the storage medium to update the query result.

A device for processing information by batch-stream fusion is characterized by comprising:
- a client used for obtaining the index based on the input query statement;
- a query engine used for extracting the pre-computed index data segment based on the index as the query result; and
- an updating module used for extracting the re-computed index data segment to update the query result.

Preferably, the query engine is used for:
- acquiring statistical information of the index;
- retrieving a pre-created index with the statistical information in an internal memory;
- positioning the pre-computed index data segment in the storage medium based on the pre-created index;
- taking the positioned pre-computed index data segment as the query result.

Preferably, the query engine includes:
- a pre-created index definition module used for defining the pre-created index based on a predefined unified model;
- a pre-computation module used for performing pre-computation based on the pre-created index to obtain the index data segment; and
- an information storage module used for storing the statistical information of the pre-created index into the internal memory and storing the pre-computed index data segment in the storage medium.

Preferably, the pre-created index definition module is used for:
- obtaining a pre-created stream data source mapping table and a batch data source mapping table, the stream data source mapping table being a fact table, and the batch data source mapping table being a shadow table bound with the stream data source mapping table;
- obtaining a dimension and a measurement of connection between the pre-created fact table and the shadow table;
- determining a connection relationship of the fact table and the shadow table to the dimension table based on the obtained dimension and measurement; and
- defining the pre-created index based on the connection relationship.

Preferably, the pre-computation module is used for:
- obtaining the pre-created index, the pre-created index being divided into a batch index, a stream index and a fusion index;
- pre-computing in a data source through a computation engine based on the pre-created index, the computation engine comprising a batch processing computation engine and a stream processing computation engine, and the data source including a batch data source and a stream data source; and
- obtaining the pre-computed index data segment based on pre-computation, the pre-computed index data segment being divided into a batch index data segment and a stream index data segment.

Preferably, the information storage module is used for:
- extracting statistical information of the pre-created index, the statistical information including the number of rows, the size and the cardinal number.

Preferably, the updating module is used for:
- performing re-computation in the data source based on the index, the index being divided into the batch index, the stream index and the fusion index, and the data source including the batch data source and the stream data source;
- performing re-computation through the computation engine to obtain a re-computed index data segment, the computation engine comprising the batch processing computation engine and the stream processing computation engine, and the re-computed index data segment being divided into the batch index data segment and the stream index data segment.
- storing the re-computed index data segment in the storage medium; and
- extracting the re-computed index data segment in the storage medium to update the query result.

Electronic equipment comprises a memory and a processor, wherein the memory stores a computer program; and the electronic equipment is characterized in that the computer program executes any one of the abovementioned methods in the processor.

The storage medium stores the computer program which executes any one of the abovementioned methods in the processor.

According to the present invention, the unified model is defined, so that the technical effect of simultaneously analyzing historical data and real-time data through a SQL query statement is achieved; through a pre-computation and real-time combination technology, the technical effect of effectively reducing the query response time is achieved; the computation result is stored in the storage medium to be repeatedly used, thus the technical effect of guaranteeing the system stability is achieved; and the re-computed result is continuously stored in the storage medium, thus the technical effect of updating the query result is achieved.

DETAILED DESCRIPTION OF THE PRESENT INVENTION

In order to make the objectives, technical solutions and advantages of the present invention clearer, the present invention will be further described in detail below with reference to the accompanying drawings and embodiments. It is to be understood that, in the description of the present invention, unless otherwise expressly specified and limited, the term "storage medium" can be various media that can store computer programs, such as ROM, RAM, magnetic disk or optical disk. The term "processor" can be CPLD (Complex Programmable Logic Device), FPGA (Field-Programmable Gate Array), MCU (Microcontroller Unit), PLC (Programmable Logic Controller) and CPU (Central Processing Unit) and other chips or circuits with data processing functions. The term "electronic equipment" can be any device with data processing and storage functions, and can generally include a fixed terminal and a mobile terminal. The fixed terminal can be a desktop, etc. The mobile terminal can be a mobile phone, a PAD, a mobile robot, etc. In addition, the technical features involved in the different embodiments of the present invention described later can be combined with each other as long as there is no conflict with each other.

The present invention provides some preferred embodiments below to teach those skilled in the art to realize them.

Embodiment 1

Figure 1:
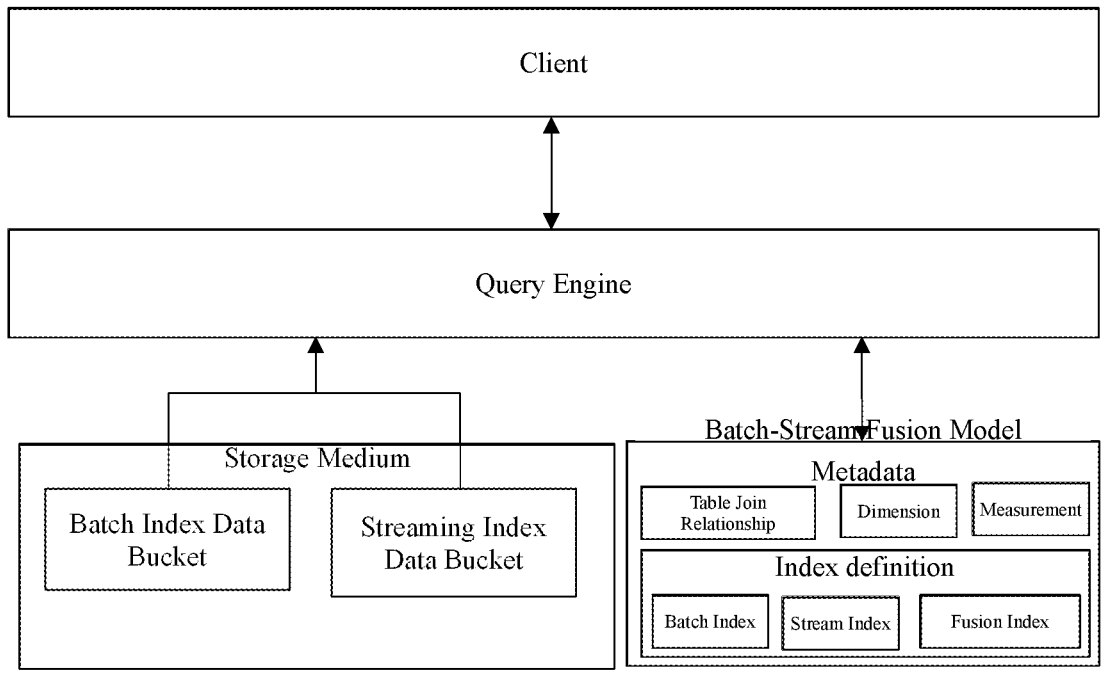
FIG. 1 is a flow chart of a method for processing information by batch-stream fusion of the present invention.

The embodiment provides a method for processing information by batch-stream fusion, as shown in FIG. 1, the method comprises the following steps:

S100, obtaining an index based on an input query statement;

S200, extracting a pre-computed index data segment based on the index as a query result; and S300, extracting the re-computed index data, obtaining an index segment based on the input query statement, and updating the query result.

In a further embodiment, the step of obtaining the index based on the input query statement specifically includes:

S110, obtaining the input query statement;

S120, retrieving keywords in the query statement;

S130, associating to obtain a dimension and a measurement according to the retrieved keywords; and S140, creating an index according to the dimension and the measurement obtained through association.

In a still further embodiment, the step of obtaining the keyword associated index specifically includes:

S131, setting the keywords based on the type of the dimension and the measurement;

S132, establishing a mapping relationship between the keywords and the type of represented the dimension and the measurement; and S133, obtaining the type of the represented dimension and the measurement when the keywords are retrieved.

In a further embodiment, the step of extracting the pre-computed index data segment based on the index as the query result specifically includes:

S210, acquiring statistical information of the index;

S220, retrieving the pre-created index with the statistical information into the internal memory;

S230, positioning the pre-computed index data segment in the storage medium based on the pre-created index; and S240, taking the positioned pre-computed index data segment as the query result.

In a still further embodiment, the step of acquiring the statistical information of the index specifically includes:

S211, receiving a created index;

S212, counting the index; and

S213, obtaining related statistical information according to a statistical result, the statistical information including but being not limited to the number of rows, the size and the cardinal number.

In a further embodiment, the step of extracting the pre-computed index data segment specifically includes:

S250, defining the pre-created index based on the pre-defined unified model;

S260, performing pre-computation based on the pre-created index to obtain the index data segment; and S270, storing the statistical information of the pre-created index into the internal memory, and storing the pre-computed index data segment in the storage medium.

Figure 2:
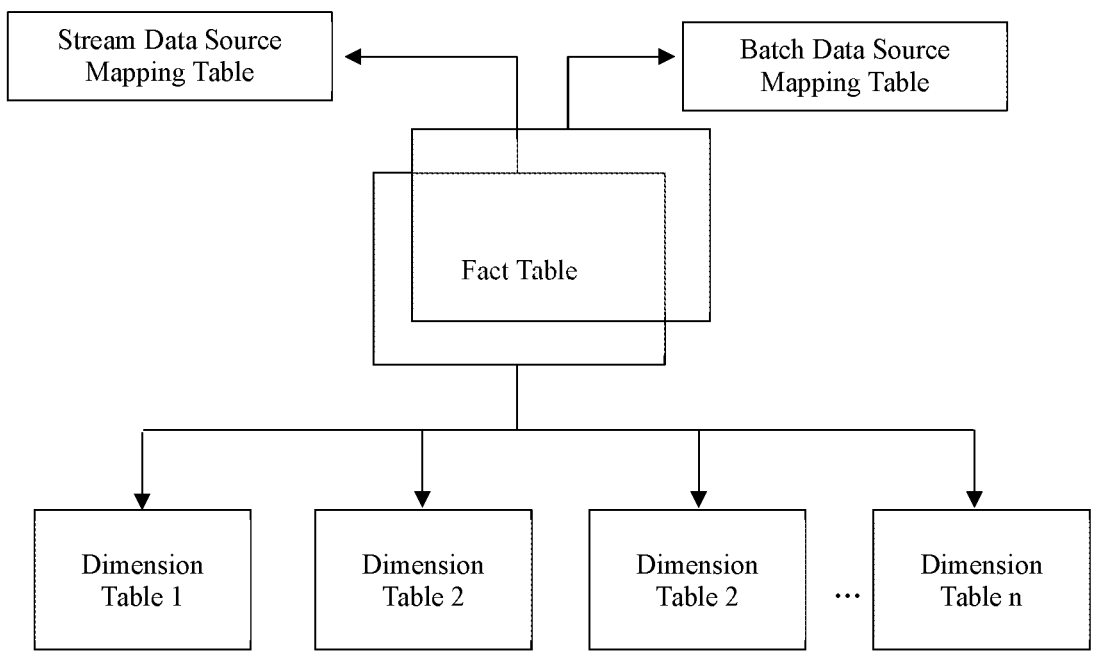
FIG. 2 is a diagram of a predefined unified model of the present invention.
Figure 3:
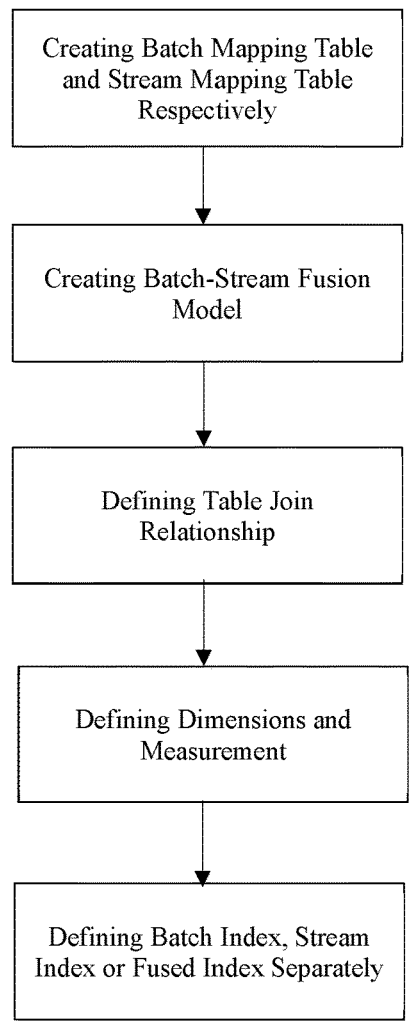
FIG. 3 is a flow chart of defining a pre-created index of the present invention.

In a still further embodiment, as shown in FIG. 2 and FIG. 3, the step of defining the pre-created index based on the pre-defined unified model specifically includes:

S251, obtaining the pre-created stream data source mapping table and the batch data source mapping table, the stream data source mapping table being a fact table, and the batch data source mapping table being a shadow table bound with the stream data source mapping table;

S252, obtaining a dimension and a measurement of connection between the pre-created fact table and the shadow table;

S253, determining a connection relationship of the fact table and the shadow table to the dimension table based on the obtained dimension and measurement; and S254, defining the pre-created index based on the connection relationship.

Figure 4:
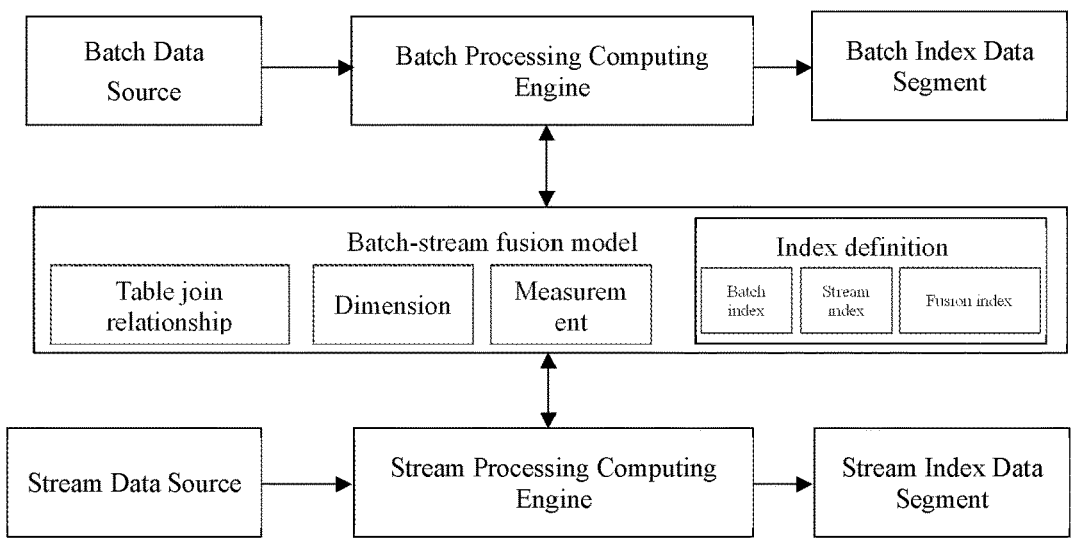
FIG. 4 is a flow chart of computing an index data segment based on a pre-created index of the present invention.

In a still further embodiment, as shown in FIG. 4, the step of computing based on the pre-created index to obtain the index data segment specifically includes:

S261, obtaining the pre-created index, the pre-created index being divided into a batch index, a stream index and a fusion index;

S262, pre-computing in a data source through a computation engine based on the pre-created index, the computation engine comprising a batch processing computation engine and a stream processing computation engine, and the data source including a batch data source and a stream data source; and S263, obtaining the pre-computed index data segment based on pre-computation, the pre-computed index data segment being divided into a batch index data segment and a stream index data segment.

In a further embodiment, the step of storing the statistic information of the pre-created index into the internal memory specifically includes:

extracting statistical information of the pre-created index, the statistical information including but being not limited to the number of rows, the size and the cardinal number.

In a further embodiment, the step of extracting the re-computed index data segment to update the query result specifically includes:

S310, performing re-computation in the data source based on the index, the index being divided into the batch index, the stream index and the fusion index, and the data source including the batch data source and the stream data source.

S320, performing re-computation through the computation engine to obtain the re-computed index data segment, the computation engine comprising the batch processing computation engine and the stream processing computation engine, and the re-computed index data segment being divided into the batch index data segment and the stream index data segment;

S330, storing the re-computed index data segment in the storage medium; and

S340, extracting the re-computed index data segment in the storage medium to update the query result.

From the above description, the present invention achieves the following technical effects:

1, the unified model is defined, so that the technical effect of simultaneously analyzing historical data and real-time data through the SQL query statement is achieved;

2, through a pre-computation and real-time combination technology, the technical effect of effectively reducing the query response time is achieved;

3, the computation result is stored in the storage medium to be repeatedly used, thus the technical effect of guaranteeing the system stability is achieved; and 4, the re-computed result is continuously stored in the storage medium, thus the technical effect of updating the query result is achieved.

Embodiment 2

The present invention relates to a device for processing information by batch-stream fusion. The device is characterized by comprising:

a client used for obtaining the index based on the input query statement;

a query engine used for extracting the pre-computed index data segment based on the index as the query result; and an updating module used for extracting the re-computed index data segment to update the query result.

In a further embodiment, the query engine is used for:

acquiring statistical information of the index;

retrieving a pre-created index with the statistical information in an internal memory; positioning the pre-computed index data segment in the storage medium based on the pre-created index;

taking the positioned pre-computed index data segment as the query result.

In a further embodiment, the query engine includes:

a pre-created index definition module used for defining the pre-created index based on a predefined unified model;

a pre-computation module used for performing pre-computation based on the pre-created index to obtain the index data segment; and an information storage module used for storing the statistical information of the pre-created index into the internal memory and storing the pre-computed index data segment in the storage medium.

In a still further embodiment, the pre-created index definition module is used for:

obtaining a pre-created stream data source mapping table and a batch data source mapping table, the stream data source mapping table being a fact table, and the batch data source mapping table being a shadow table bound with the stream data source mapping table;

obtaining a dimension and a measurement of connection between the pre-created fact table and the shadow table;

determining a connection relationship of the fact table and the shadow table to the dimension table based on the obtained dimension and measurement; and defining the pre-created index based on the connection relationship.

In a still further embodiment, the pre-computation module is used for:

obtaining the pre-created index, the pre-created index being divided into a batch index, a stream index and a fusion index;

pre-computing in a data source through a computation engine based on the pre-created index, the computation engine comprising a batch processing computation engine and a stream processing computation engine, and the data source including a batch data source and a stream data source; and obtaining the pre-computed index data segment based on pre-computation, the pre-computed index data segment being divided into a batch index data segment and a stream index data segment.

In a still further embodiment, the information storage module is used for:

extracting statistical information of the pre-created index, the statistical information including the number of rows, the size and the cardinal number.

In a further embodiment, the updating module is used for:

performing re-computation in the data source based on the index, the index being divided into the batch index, the stream index and the fusion index, and the data source including the batch data source and the stream data source;

performing re-computation through the computation engine to obtain a re-computed index data segment, the computation engine comprising the batch processing computation engine and the stream processing computation engine, and the re-computed index data segment being divided into the batch index data segment and the stream index data segment.

storing the re-computed index data segment in the storage medium; and extracting the re-computed index data segment in the storage medium to update the query result.

Embodiment 3

In this embodiment, the dimension of a pre-created index is an insurance seller (seller_id) and a date, the measurement is the sum (amount) of insurance policy amounts, and the aggregation degree of the index may not be very high due to the fact that the number of sellers may be large. The data content corresponding to this pre-created index may be shown in the following Table 1 and is a result obtained by summarizing the transaction amount of the sales record of each seller every day:

TABLE 1

| Seller_Id | Date | Sum(amount) |
|---|---|---|
| 10001 | May 1, 2020 00:00:00 | 100 |
| 10001 | May 1, 2020 00:10:00 | 200 |
| 10002 | May 1, 2020 00:20:00 | 150 |
| 10003 | May 1, 2020 00:30:00 | 80 |
| 10003 | May 1, 2020 00:40:00 | 30 |

It is assumed that there are 100,000 sellers in total, the remaining 100,000 rows of pre-computation results are omitted here.

The data content in this table is the batch index data segment; the system will compute the pre-created index, and the computed pre-computation result will be stored, that is, the data of the table is stored in real time.

The method for processing information by batch-stream fusion provided by the embodiment comprises the following steps:

S100, obtaining an index based on an input query statement;

A user provides a query,

SQL 1 analyzes the total transaction amount of the seller with the number 10003 from May 1, 2020 to now: Select sum(amount) from transactions where date>timestamp (2020-05-01 00:00:00') and seller_id='10003'

When streaming real-time data is continuously generated during consumption, the system will establish an index close to the pre-created index for this query.

In a further embodiment, the step of obtaining the index based on the input query statement specifically includes:

S110, obtaining the input query statement;

S120, retrieving keywords in the query statement;

S130, associating to obtain a dimension and a measurement according to the retrieved keywords; and S140, creating an index according to the dimension and the measurement obtained through association.

In a still further embodiment, the step of obtaining the keyword associated index specifically includes:

S131, setting the keywords based on the type of the dimension and the measurement;

S132, establishing a mapping relationship between the keywords and the type of represented the dimension and the measurement; and S133, obtaining the type of the represented dimension and the measurement when the keywords are retrieved.

Keywords including seller_id, May 1, 2020 (date) and the sum (amount) of total transaction amount are retrieved in the query statement SQL 1, wherein the associated dimensions of the seller and May 1, 2020 are the insurance seller (seller_id) and the date respectively, and the associated measurement of the sum (amount) of the total transaction amount is the sum (amount) of insurance policy amounts.

The method for processing information by batch-stream fusion provided by the embodiment comprises the following steps:

S200, extracting a pre-computed index data segment based on the index as a query result; and During querying the statement in the SQL 1, a result pre-stored in the storage medium is directly utilized for direct answering, that is, the data in the Table 1 is also batch data, and thus the performance, efficiency and stability of the system are guaranteed.

In a further embodiment, the step of extracting the pre-computed index data segment based on the index as the query result specifically includes:

S210, acquiring statistical information of the index;

S220, retrieving the pre-created index with the statistical information into the internal memory;

S230, positioning the pre-computed index data segment in the storage medium based on the pre-created index; and S240, taking the positioned pre-computed index data segment as the query result.

The index has three columns, and the base number of each column is Seller_Id, Date and Sum (amount). The pre-created index can be obtained by detecting in the statistical information of the pre-created index stored into the internal memory, and the pre-computed index data segment is positioned in the storage medium, namely Table 1, and the Table 1 is answered as a query result.

In a still further embodiment, the step of acquiring the statistical information of the index specifically includes:

S211, receiving a created index;

S212, counting the index; and

S213, obtaining related statistical information according to a statistical result, the statistical information including but being not limited to the number of rows, the size and the cardinal number.

The statistical information of this index obtained by statistics has three columns, and the base number of each column is Seller_Id, Date and Sum (amount).

In a further embodiment, the step of extracting the pre-computed index data segment specifically includes:

S250, defining the pre-created index based on the pre-defined unified model;

S260, performing pre-computation based on the pre-created index to obtain the index data segment; and S270, storing the statistical information of the pre-created index into the internal memory, and storing the pre-computed index data segment in the storage medium.

In a still further embodiment, as shown in FIG. 2 and FIG. 3, the step of defining the pre-created index based on the pre-defined unified model specifically includes:

S251, obtaining the pre-created stream data source mapping table and the batch data source mapping table, the stream data source mapping table being a fact table, and the batch data source mapping table being a shadow table bound with the stream data source mapping table;

S252, obtaining a dimension and a measurement of connection between the pre-created fact table and the shadow table;

S253, determining a connection relationship of the fact table and the shadow table to the dimension table based on the obtained dimension and measurement; and S254, defining the pre-created index based on the connection relationship.

The dimensions are the insurance seller (seller_id) and the date respectively, and the measurement is the sum (amount) of the insurance policy amounts.

In a still further embodiment, as shown in FIG. 4, the step of computing based on the pre-created index to obtain the index data segment specifically includes:

S261, obtaining the pre-created index, the pre-created index being divided into a batch index, a stream index and a fusion index;

S262, pre-computing in a data source through a computation engine based on the pre-created index, the computation engine comprising a batch processing computation engine and a stream processing computation engine, and the data source including a batch data source and a stream data source; and S263, obtaining the pre-computed index data segment based on pre-computation, the pre-computed index data segment being divided into a batch index data segment and a stream index data segment.

The batch index data segment obtained by pre-computation is the Table 1.

In a further embodiment, the step of storing the statistic information of the pre-created index into the internal memory specifically includes:

extracting statistical information of the pre-created index, the statistical information including but being not limited to the number of rows, the size and the cardinal number.

The method for processing information by batch-stream fusion provided by the embodiment comprises the following steps:

S300, extracting the re-computed index data, obtaining an index segment based on the input query statement, and updating the query result.

continuously storing the re-computed result into the storage medium, and correspondingly updating the result in the query.

In a further embodiment, the step of extracting the re-computed index data segment to update the query result specifically includes:

S310, performing re-computation in the data source based on the index, the index being divided into the batch index, the stream index and the fusion index, and the data source including the batch data source and the stream data source.

S320, performing re-computation through the computation engine to obtain the re-computed index data segment, the computation engine comprising the batch processing computation engine and the stream processing computation engine, and the re-computed index data segment being divided into the batch index data segment and the stream index data segment;

S330, storing the re-computed index data segment in the storage medium; and

S340, extracting the re-computed index data segment in the storage medium to update the query result.

Embodiment 4

The embodiment of the present invention further comprises electronic equipment which comprises a memory and a processor, wherein the memory stores a computer program, and the computer program is used for realizing the method for processing information by batch-stream fusion when being executed in the processor. The method comprises:
obtaining an index based on an input query statement;
extracting a pre-computed index data segment based on the index as a query result; and
extracting a re-computed index data segment to update the query result.

Embodiment 5

In the embodiment, the present invention further provides a readable storage medium, a computer program is stored in the readable storage medium and is for achieving the method for processing information by batch-stream fusion when being executed by the processor, and the method comprises:
obtaining an index based on an input query statement;
extracting a pre-computed index data segment based on the index as a query result; and
extracting a re-computed index data segment to update the query result.

The readable storage medium can be a computer storage medium or a communication medium. The communication medium comprises any medium convenient for transmitting the computer program from one place to another place. The storage medium can be any available medium which can be accessed by a general purpose or special purpose computer. For example, the readable storage medium is coupled to the processor, so that the processor can read information from the readable storage medium and write the information into the readable storage medium. Certainly, the readable storage medium can also be a component of the processor. Processors and the readable storage medium can be positioned in an Application Specific Integrated Circuits (ASIC). In addition, the ASIC can be located in user equipment. Of course, the processors and the readable storage medium can also serve as discrete components in communication equipment. The readable storage medium can be a read-only memory (ROM), a random access memory (RAM), a CD-ROM, a magnetic tape, a floppy disk, optical data storage equipment and the like.

The present invention further provides a program product. The program product comprises an execution instruction which is stored in the readable storage medium. At least one processor of the equipment can read the execution instruction from the readable storage medium, and at least one processor executes the execution instruction to enable the equipment to implement the methods provided by the above-mentioned various embodiments.

In the abovementioned embodiments of the terminal or server, it is to be understood that the processor may be Central Processing Unit (CPU), or other universal processors, Digital Signal Processor (DSP), etc. The general processor can be a microprocessor or any conventional processor and the like. The steps of the method disclosed by the embodiment of the present invention can be directly executed by a hardware decoding processor or executed by the combination of hardware and software modules in the decoding processor.

It needs to be explained that the steps shown in the flowchart of the drawing can be executed in a computer system such as a group of computer executable instructions; and although the logic sequence is shown in the flowchart, the shown or described steps can be executed in a sequence different from the sequence herein in some cases.

Obviously, those skilled in the art should understand that each module or each step of the present invention can be realized by the universal computing system, the modules or steps can be concentrated on a single computing system or distributed on a network formed by a plurality of computing systems, and optionally, the modules or steps can be realized by program codes executable by the computing systems, so that the modules or steps can be stored in a storage system and executed by the computing systems, or the modules or steps can be respectively manufactured into integrated circuit modules, or a plurality of modules or steps in the modules or steps are manufactured into a single integrated circuit module. Therefore, the present invention is not limited to any particular combination of hardware and software.

The above descriptions are only preferred embodiments of the present invention and are not intended to limit the present invention. Any modifications, equivalent replacements and improvements made within the spirit and principles of the present invention shall be included in the protection range of the present invention.

The invention claimed is:

1. A method for processing information by batch-stream fusion, comprising:
obtaining an index based on an input query statement by a client;
extracting a pre-computed index data segment based on the index as a query result by a query engine; and
extracting a re-computed index data segment to update the query result by an updating device, wherein the step of extracting the pre-computed index data segment based on the index as the query result specifically includes:
acquiring statistical information of the index by the query engine;
retrieving a pre-created index with the statistical information in an internal memory by the query engine;
positioning the pre-computed index data segment in a storage medium based on the pre-created index by the query engine;
taking the positioned pre-computed index data segment as the query result by the query engine, wherein the step of extracting the pre-computed index data segment specifically includes:
defining a pre-created index based on a predefined unified model by a pre-created index definition device;
performing pre-computation based on the pre-created index to obtain the index data segment by a pre-computation device; and
storing the statistical information of the pre-created index in an internal memory, and storing the pre-computed index data segment in the storage medium by an information storage device, wherein the step of extracting the re-computed index data segment to update the query result specifically includes:
performing re-computation in a data source based on the index, the index being divided into a batch index, a stream index and a fusion index, and the data source including a batch data source and a stream data source by the updating device;
performing re-computation through the computation engine to obtain a re-computed index data segment, the computation engine comprising the batch processing computation engine and the stream processing computation engine, and the re-computed index data segment being divided into a batch index data segment and a stream index data segment by the updating device;
storing the re-computed index data segment in the storage medium by the updating device; and extracting the re-computed index data segment in the storage medium to update the query result by the updating device.

2. The method according to claim 1, wherein the step of defining the pre-created index based on the pre-defined unified model specifically includes:
   obtaining a pre-created stream data source mapping table and a batch data source mapping table, the stream data source mapping table being a fact table, and the batch data source mapping table being a shadow table bound with the stream data source mapping table by the pre-created index definition device;
   obtaining a dimension and a measurement of connection between the pre-created fact table and the shadow table by the pre-created index definition device;
   determining a connection relationship of the fact table and the shadow table to the dimension table based on the obtained dimension and measurement by the pre-created index definition device; and
   defining the pre-created index based on the connection relationship by the pre-created index definition device.

3. The method according to claim 1, wherein the step of computing based on the pre-created index segment to obtain the index data segment specifically includes:
   obtaining the pre-created index, the pre-created index being divided into a batch index, a stream index and a fusion index by the pre-computation device;
   pre-computing in a data source through a computation engine based on the pre-created index, the computation engine comprising a batch processing computation engine and a stream processing computation engine, and the data source including a batch data source and a stream data source by the pre-computation device; and
   obtaining the pre-computed index data segment based on pre-computation, the pre-computed index data segment being divided into a batch index data segment and a stream index data segment by the pre-computation device.

4. The method according to claim 1, wherein the step of storing the statistic information of the pre-created index into the internal memory specifically includes:
   extracting statistical information of the pre-created index, the statistical information including the number of rows, the size and the cardinal number by the information storage device.

5. A device for processing information by batch-stream fusion, comprising:
   a client used for obtaining an index based on an input query statement;
   a query engine used for extracting a pre-computed index data segment based on the index as query results; and
   an updating device used for extracting a re-computed index data segment to update the query results wherein the query engine is used for:
   acquiring statistical information of the index;
   retrieving a pre-created index with statistical information in an internal memory;
   positioning the pre-computed index data segment in a non-transitory computer readable storage medium based on pre-created index;
   taking positioned pre-computed index data segment as the query result, wherein the query engine includes:
   a pre-created index definition device used for defining the pre-created index based on a predefined unified model;
   a pre-computation device used for performing pre-computation based on the pre-created index to obtain an index data segment; and
   an information storage device, comprising a processor, used for storing the statistical information of the pre-created index into an internal memory and storing the pre-computed index data segment in the non-transitory computer readable storage medium, wherein the updating device is used for:
   performing re-computation in a data source based on the index, the index being divided into batch index, stream index and fusion index, and the data source including batch data source and stream data source;
   performing re-computation through a computation engine to obtain the re-computed index data segment, the computation engine comprising a batch processing computation engine and a stream processing computation engine, and the re-computed index data segment being divided into a batch index data segment and a stream index data segment;
   storing the re-computed index data segment in the non-transitory computer readable storage medium; and
   extracting the re-computed index data segment in the non-transitory computer readable storage medium to update the query results.

6. The device according to claim 5, wherein the pre-created index definition device is used for:
   obtaining a pre-created stream data source mapping table and a batch data source mapping table, the stream data source mapping table being a fact table, and the batch data source mapping table being a shadow table bound with the stream data source mapping table;
   obtaining a dimension and a measurement of connection between the pre-created fact table and the shadow table;
   determining a connection relationship of the fact table and the shadow table to the dimension table based on the obtained dimension and measurement; and
   defining the pre-created index based on the connection relationship.

7. The device according to claim 5, wherein the pre-computation device is used for:
   obtaining the pre-created index, the pre-created index being divided into a batch index, a stream index and a fusion index;
   pre-computing in a data source through a computation engine based on the pre-created index, the computation engine comprising a batch processing computation engine and a stream processing computation engine, and the data source including a batch data source and a stream data source; and
   obtaining the pre-computed index data segment based on pre-computation, the pre-computed index data segment being divided into a batch index data segment and a stream index data segment.

* * * * *